United States Patent Office 3,169,138
Patented Feb. 9, 1965

3,169,138
1-CHLORO-N-SULFONYL-FORMAMIDINES AND PROCESS FOR THEIR MANUFACTURE
Walter Aumüller, Kelkheim, Taunus, Germany, assignor to Farbwerke Hoechst Aktiengesellschaft vormals Meister Lucius & Brüning, Frankfurt am Main, Germany, a corporation of Germany
No Drawing. Filed Feb. 18, 1963, Ser. No. 259,404
Claims priority, application Germany, Feb. 24, 1962, F 36,120
11 Claims. (Cl. 260—397.7)

The present invention relates to 1-chloro-N-sulfonyl-formamidines of the general formula R—SO$_2$—N=C—NH—R'
   |
   Cl (I)

in which R represents an aliphatic or cycloaliphatic hydrocarbon radical or an aromatic hydrocarbon radical which may contain as substituents 1 or 2 alkyl groups, alkoxy groups, halogen atoms, acyl groups or radicals convertible into amino groups, or a phenyl-alkyl radical, and R' represents a saturated or unsaturated aliphatic or cycloaliphatic alkyl radical which may be interrupted by oxygen, or a phenyl-alkyl radical. These compounds are valuable starting substances for the synthesis of therapeutically important products and certain of them, showing hypoglycemic properties, can likewise be used as medicaments.

The present invention likewise relates to the production of said 1-chloro-N-sulfonyl-formamidines by reacting sulfonyl-thioureas of the general formula

R—SO$_2$—NH—CS—NH—R' in which R and R' have the meanings given above, with phosgene or substances splitting off phosgene.

The course of the reaction of the process of the present invention, for example, can be explained as follows:

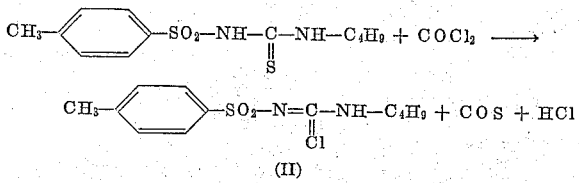

(II)

According to German patent application No. 1,119,258 laid open to public inspection mono- or poly-alkylated or arylated formamidine hydrochlorides are obtained by the reaction of phosgene with the corresponding thioureas. It could, however, not be expected that sulfonyl-thioureas of the above-mentioned formula under the action of phosgene would lead to 1-chloro-N-sulfonyl-formamidines and that, for instance, it would be possible to convert N-(4-methyl-benzenesulfonyl)-N'-n-butyl-thiourea without difficulties and with excellent yields into 1-chloro-N-(4-methyl-benzenesulfonyl)-N'-n-butyl formamidine. It is known that due to the presence of the sulfonyl radical the nature of a corresponding urea or thiourea derivative is changed to a large extent so that compounds showing new properties are formed. Ureas, for example, are basic compounds, whereas benzenesulfonyl-ureas such as benzenesulfonyl-thioureas, are acid compounds capable of forming relatively stable salts with bases or alkaline agents. It can be deduced even from the properties of the isocyanates on which the ureas are based that the introduction of the sulfonyl radical brings about important changes in the reactivity of ureas. For example, benzenesulfonyl-isocyanates are extremely sensitive compounds which, as regards reactivity, are far superior to alkyl-isocyanates. Benzenesulfonyl-mustard oils have not been synthesized up to now. This different reactivity of the elementary substances is demonstrated to a certain degree likewise by the corresponding urea or thiourea derivatives themselves. For instance, benzenesulfonyl-ureas can be acylated with acid chlorides or anhydrides under special circumstances only (cf. German Patent 1,046,026), whereas alkyl-ureas and aryl-ureas as well as the corresponding thio-compounds can be acylated with acid anhydrides without difficulties by simple heating. Whereas, furthermore, according to German patent application No. 1,119,852 laid open to public inspection alkyl-ureas and aryl-ureas can likewise be converted by means of phosgene into 1-chloro-formamidines, this is not possible, if benzenesulfonyl-alkyl-ureas are used even if the conditions are considerably varied. N-sulfonyl-N'-phenyl-thioureas can likewise not be converted into corresponding 1-chloro-formamidines; sulfur-containing compounds of hitherto unknown constitution being obtained by this reaction.

As starting substances for the process according to the invention there may be used: Benzenesulfonyl-thioureas, substituted benzenesulfonyl-thioureas especially those in which preferably one or two hydrogen atoms are substituted by halogen atoms, alkyl groups, alkoxy groups, acyl radicals as well as radicals which are convertible into the amino group, for instance acetylamino groups and nitro groups. Furthermore, there may be mentioned alkane-, phenylalkane-, naphthalene-, tetrahydronaphthalene-, diphenyl- and phenoxy-phenyl-sulfonyl-thioureas. The above-mentioned sulfonyl-thioureas may carry at the side of the molecule opposite to the sulfonyl radical a saturated or unsaturated aliphatic radical which may likewise be interrupted by oxygen, as well as a phenyl-alkyl radical. There may be mentioned, for instance: N-benzenesulfonyl-N'-n-butyl-thiourea, N-(4-methyl-benzenesulfonyl)-N'-n-butyl-thiourea, N-(4-methyl-benzenesulfonyl)-N'-cyclohexyl-thiourea, N-(4-methyl-benzenesulfonyl)-N'-cyclohexyl-methyl-thiourea, N-(4-chloro-benzenesulfonyl)-N'-n-propyl-thiourea and N-(4-acetyl-benzenesulfonyl)-N'-cyclohexyl-thiourea.

The process of the present invention is suitably realized by dissolving or suspending the thiourea in an appropriate solvent, such as tetrahydrofurane or benzene or another inert solvent, for instance ether, halogenated ether, or dioxane, and then introducing phosgene at room temperature. It is of no importance whether the phosgene is used in a molar proportion or in excess. Room temperature is favorably chosen as reaction temperature, but moderately elevated or reduced temperatures may likewise be used.

It is likewise possible to proceed in a reverse manner by starting from a phosgene solution into which the thiourea is introduced. Instead of phosgene there can likewise be used with advantage compounds which in the course of the reaction deliver phosgene, for instance, 1-chloro-formic acid trichloromethyl ester. The desired products are likewise obtained, although in a smaller yield, by using oxallyl chloride. The products are suitably isolated by considerably concentrating the reaction solution under reduced pressure and by crystallizing the residue. The crude products thus obtained can immediately be used for further reactions or they can be recrystallized in inert solvents such as benzene.

The compounds according to the invention are easily crystallizing compounds not capable of forming salts with acids. They are characterized by a noticeable reactivity. The chlorine atom linked to the central carbon atom is extraordinarily reactive and can be exchanged under the mildest conditions for the most various radicals. It is, for instance, possible to convert 1-chloro-N-benzenesulfonyl-N'-alkyl-formamidines with dilute alkalies, suitably after solution in an appropriate solvent, such as dimethyl-formamide, in nearly quantitative yield at room temperature into corresponding benzenesulfonyl-alkyl-ureas. By causing alcohols to act thereon, favorably in the presence of a small amount of alkali metal hydroxide solution, corresponding benzene-sulfonyl-iso-urea-alkali ethers are obtained. Treatment with amines gives rise to the formation of corresponding benzene-sulfonyl-guanidines.

The above-mentioned reactions of the amidines can be demonstrated, for example, as follows:

(II)

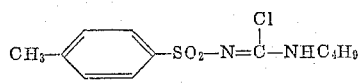

(a)

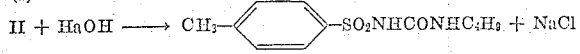

(b)

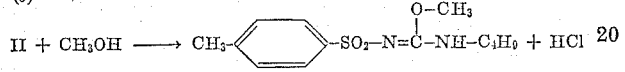

(c)

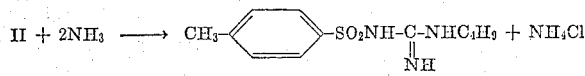

(d)

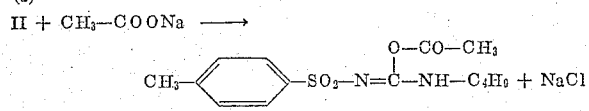

The products of the present invention are valuable starting substances for the synthesis of therapeutically interesting products such as the benzene-sulfonyl-ureas known as antidiabetics for oral application (cf. reaction (a)).

The isourea-ethers or guanidines which may be obtained, for instance, from the amidines (reactions (b) and (c)) can likewise be converted by hydrolysis into the corresponding benzenesulfonyl-ureas.

Certain of the products of the invention are likewise characterized by a good hypoglycemic action and can, therefore, be used for orally treating Diabetes mellitus.

The reduction of the blood sugar level attained upon oral application of 1-chloro-N-(4-methyl-benzenesulfonyl)-N'-cyclohexyl-formamidine can be seen from the following table:

RABBIT—ADMINISTERED: 400 MG./KG.

| Time in hours | 1 | 2 | 3 | 4 | 6 |
|---|---|---|---|---|---|
| Reduction of blood-sugar level in percent | 0 | −35 | −21 | −17 | −15 |

DOG—ADMINISTERED: 100 MG./KG.

| Time in hours | 1 | 2 | 3 | 4 | 5 | 6 | 24 |
|---|---|---|---|---|---|---|---|
| Reduction of blood-sugar level in percent | −9 | −16 | −19 | −22 | −25 | −32 | −25 |

As medicinal compositions there are preferred tablets containing in addition to the products of the present invention the usual adjuvants and carrier substances, such as talc, starch, lactose, tragacanth or magnesium stearate.

The following examples serve to illustrate the invention but they are not intended to limit it thereto:

EXAMPLE 1

*1-chloro-N-(4-methyl-benzenesulfonyl)-N'-isobutyl-formamidine*

(a) 14.3 grams of N-(4-methyl-benzenesulfonyl)-N'-isobutyl-thiourea are dissolved in 250 milliliters of absolute tetrahydrofurane. Phosgene is introduced into the solution until saturation occurs. The temperature temporarily reaches 35° C. After having blown air through the solution, the latter is concentrated under reduced pressure. The crystalline residue of 1-chloro-N-(4-methyl-benzenesulfonyl)-N'-isobutyl-formamidine obtained in nearly quantitative yield melts at 90–92° C. after having been recrystallized from acetic acid ester.

(b) 1 gram of the 1-chloro-formamidine thus obtained is dissolved in methanol. Some drops of sodium hydroxide solution are added to the solution and the whole is allowed to stand for 30 minutes at room temperature. After dilution with water, acidification with dilute hydrochloric acid there is obtained the N-(4-methyl-benzenesulfonyl)-N'-isobutyl-isourea-methyl-ether which melts at 76–77° C.

EXAMPLE 2

*1-chloro-N-(4-methyl-benzenesulfonyl)-N'-cyclohexyl-methyl-formamidine*

(a) 16.3 grams of N-(4-methyl-benzenesulfonyl)-N'-cyclohexyl-methyl-thiourea are dissolved in 300 milliliters of tetrahydrofurane and phosgene is introduced until the solution is saturated. After treatment according to Example 1, a crystalline residue of 1-chloro-N-(4-methyl-benzenesulfonyl)-N'-cyclohexyl-methyl-formamidine is obtained which upon recrystallization from a mixture of benzene and petroleum ether melts at 94–96° C.

(b) 100 milliliters of normal sodium hydroxide solution are poured over 3.20 grams of the compound thus obtained, and the whole is moderately heated for a few minutes on the steam bath. Upon addition of a further 100 milliliters of water dissolution sets in. After heating for a total of 10 minutes, the solution is cooled and acidified by means of dilute hydrochloric acid. The compound obtained in a yield of about 85–90% is identified as N-(4-methyl-benzenesulfonyl)-N'-cyclohexyl-methyl-urea according to melting point and mixed melting point (178–179° C.).

EXAMPLE 3

*1-chloro-N-(4-methyl-benzenesulfonyl)-N'-n-butyl-formamidine*

As described in Example 1, 1-chloro-N-(4-methyl-benzenesulfonyl)-N'-n-butyl-formamidine is obtained from 14.3 grams of N-(4-methyl-benzenesulfonyl)-N'-n-butyl-thiourea and phosgene in nearly quantitative yield. After recrystallization from benzene the compound melts at 100–101° C.

In an analogous manner there are obtained:

1-chloro-N-(4-ethyl-benzenesulfonyl)-N'-n-propyl-formamidine,
1-chloro-N-(4-n-propyl-benzenesulfonyl)-N'-ethyl-formamidine,
1-chloro-N-(4-n-butyl-benzenesulfonyl)-N'-n-hexyl-formamidine,
1-chloro-N-(3-methyl-benzenesulfonyl)-N'-isopropyl-formamidine,
1-chloro-N-(2-isopropyl-benzenesulfonyl)-N'-isoamyl-formamidine,
1-chloro-N-(3,4-dimethyl-benzenesulfonyl)-N'-n-butyl-formamidine,
1-chloro-N-(2,3-dimethoxy-benzenesulfonyl)-N'-ethyl-formamidine,
1-chloro-N-(2,6-diethyl-benzenesulfonyl)-N'-allyl-formamidine.

EXAMPLE 4

*1-chloro-N-(4-methyl-benzenesulfonyl)-N'-cyclohexyl-formamidine*

(a) 15.6 grams of N-(4-methyl-benzenesulfonyl)-N'-cyclohexyl-thiourea are introduced into a solution of tetrahydrofurane saturated with phosgene, whereby the reaction temperature reaches about 37° C. The reaction mixture is left for some hours and then treated as described in Example 1. The crude 1-chloro-N-(methyl-benzenesulfonyl)-N'-cyclohexyl-formamidine obained in nearly quantitative yield melts at 128–130° C. after having been recrystallized from benzene.

In an analogous manner there are obtained:

1-chloro-N-(4-methyl-benzenesulfonyl)-N'-(4'-methyl-cyclohexyl)-formamidine, and
1-chloro-N-(4-methyl-benzenesulfonyl)-N'-(4'-isopropyl-cyclohexyl)-formamidine.

(b) 1.0 gram of the compound thus obtained is dissolved in 30 milliliters of dimethyl-formamide. 5 milliliters of 2 N-sodium hydroxide solution are added and after the mixture had been abandoned for 3 to 5 hours, water is added. After acidification with hydrochloric acid a crystalline precipitate of N-(4-methyl-benzenesulfonyl)-N'-cyclohexyl-urea is obtained. (Melting point 172–173° C.)

(c) 3.3 grams of the 1-chloro-formamidine obtained as described sub (a) are dissolved in 50 milliliters of benzene. A solution of 3.7 grams of isobutylamine with 20 milliliters of benzene is added. Isobutylamine-hydrochloride separates. After having been filtered off, the filtrate is concentrated under reduced pressure and treated with water. The product thus obtained is recrystallized from dilute ethanol. The N-(4-methyl-benzenesulfonyl)-N'-cyclohexyl-N''-isobutyl-guanidine thus obtained melts at 99–101° C.

In an analogous manner 1-chloro-N-(4-methyl-benzenesulfonyl)-N'-cyclooctyl-formamidine is obtained from N-(4-methyl-benzenesulfonyl)-N'-cyclooctyl-thiourea of a melting point of 151–152° C. and phosgene. After recrystallization from a mixture of benzene and petroleum ether the compound melts at 82–84° C.

EXAMPLE 5

*1-chloro-N-(4-chloro-benzenesulfonyl)-N'-n-propyl-formamidine*

11.5 grams of N-(4-chloro-benzenesulfonyl)-N'-n-propyl-thiourea are dissolved in 100 milliliters of tetrahydrofurane. A solution of 5 grams of chloroformic acid trichloromethylester in 50 milliliters of tetrahydrofurane is added to the first solution. After standing of the mixture overnight the solvent is drawn off under reduced pressure, and the crystalline residue of 1-chloro-N-(4-chloro-benzenesulfonyl)-N'-n-propyl-formamidine obtained is dried on clay. The crude product obtained in nearly quantitative yield after recrystallization from benzene melts at 113–115° C.

In an analogous manner there are obtained 1-chloro-N-(4-bromo-benzenesulfonyl)-N'-ethyl-formamidine, 1-chloro-N-(3-fluoro-benzenesulfonyl)-N'-isobutyl-formamidine, 1-chloro-N-(2-iodo-benzenesulfonyl)-N'-n-hexyl-formamidine, 1-chloro-N-(3-chloro-4-methyl-benzenesulfonyl)-N'-isoamyl-formamidine, 1-chloro-N-(2-bromo-3-methoxy-benzenesulfonyl)-N'-n-butyl-formamidine, 1-chloro-N-(2,6-dichloro-benzenesulfonyl)-N'-isopropyl-formamidine.

EXAMPLE 6

*1-chloro-N-(4-chloro-benzenesulfonyl)-N'-benzyl-formamidine*

A suspension is formed of 17 grams of N-(4-chloro-benzenesulfonyl)-N'-benzyl-thiourea in 400 milliliters of benzene. 10 grams of chloroformic acid-trichloromethyl ester are added while stirring. The mixture is slowly heated to 40° C. whereby it is dissolved. After additional stirring for 1 hour the solvent is drawn off under reduced pressure. 1-chloro-N-(4-chloro-benzenesulfonyl)-N'-benzyl-formamidine is obtained in very good yield as a crystalline product which after recrystallization from benzene melts at 114–116° C.

EXAMPLE 7

*1-chloro-N-(4-methoxy-benzenesulfonyl)-N'-(γ-methoxy-propyl)-formamidine*

(a) Analogously to the method described in Example 6 there is obtained from 15.9 grams of N-(4-methoxy-benzenesulfonyl)-N'-(γ-methoxy-propyl)-thiourea and 10 grams of 1-chloro-formic acid trichloromethyl ester the 1-chloro-N-(4-methoxy-benzenesulfonyl)-N'-(γ-methoxy-propyl)-formamadine in nearly quantitative yield. After recrystallization from benzene the compound melts at 88–90° C.

(b) 6.4 grams of the compound obtained are suspended in 50 milliliters of glacial acetic acid. A solution containing 20 milliliters of glacial acetic acid and 1.85 grams of anhydrous sodium acetate is added to the suspension. After a few seconds solution begins and turbidity sets in. Petroleum ether is added to the reaction mixture, the upper layer is poured off and water is added to the residue whereby the mass is crystallized. It is filtered off with suction, thoroughly washed out with water and the N-(4-methoxy-benzenesulfonyl)-N'-(γ-methoxy-propyl)-isourea-O-acetyl ester (melting point 95–97° C.) is recrystallized from methanol.

EXAMPLE 8

*1-chloro-N-(cyclohexane-sulfonyl)-N'-isobutyl-formamidine*

In a manner analogous to that described in Example 3 there is obtained by introducing N-(cyclohexane-sulfonyl)-N'-isobutyl-thiourea into tetrahydrofurane saturated with phosgene the 1-chloro-N-(cyclohexane-sulfonyl)-N'-isobutyl-formamidine in nearly quantitative yield. Upon recrystallization from a mixture of benzene and petroleum ether the substance melts at 68–70° C.

In an analogous manner there are obtained:

1-chloro-N-(cyclopentane-sulfonyl)-N'-n-butyl-formamidine,
1-chloro-N-(cyclohexyl-methane-sulfonyl)-N'-isobutyl-formamidine,
1-chloro-N-(cycloheptane-sulfonyl)-N'-allyl-formamidine,
1-chloro-N-(n-butane-sulfonyl)-N''-isopropyl-formamidine,
1-chloro-N-(ethane-sulfonyl)-N'-ethyl-formamidine,
1-chloro-N-(n-hexane-sulfonyl)-N'-isobutyl-formamidine,
1-chloro-N-(benzyl-sulfonyl)-N'-n-propyl-formamidine,
1-chloro-N-(phenyl-ethane-sulfonyl)-N'-isobutyl-formamidine.

EXAMPLE 9

*1-chloro-N-(4-acetylamino-benzenesulfonyl)-N'-isobutyl-formamidine*

A suspension is formed from 30 grams of N-(4-acetyl-amino-benzenesulfonyl)-N'-isobutyl-thiourea in 700 milliliters of benzene. 18 grams of chloroformic acid trichloromethyl ester are added while stirring. After a further addition of 200 milliliters of dioxane and heating to 46° C. the reaction mixture is stirred for a further 3 hours. It is concentrated under reduced pressure, the residue obtained is pressed on clay and the 1-chloro-N-(4-acetyl-amino-benzenesulfonyl)-N'-isobutyl-formamidine thus obtained is recrystallized from a mixture of dioxane and petroleum ether. The compound obtained in good yield melts at 133–135° C.

I claim:

1. A compound of the formula

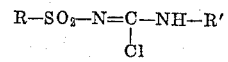

wherein R is a member selected from the group consisting of alkyl having 2–6 carbon atoms, cycloalkyl having 5–7 carbon atoms, and substituted phenyl having at most two substituents selected from the group consisting of alkyl having 1–4 carbon atoms, methoxy, halogen, and acetylamino, and R' is a member selected from the group consisting of alkyl having 2–6 carbon atoms, cycloalkyl having 6–8 carbon atoms, cyclohexyl methyl, methyl cyclohexyl, isopropyl cyclohexyl, ω-methoxy propyl, allyl, and benzyl.

2. 1 - chloro - N - (4 - methyl - benzenesulfonyl) - N'-isobutyl-formamidine.

3. 1 - chloro - N - (4 - methyl - benzenesulfonyl) - N'-cyclohexyl-methyl-formamidine.

4. 1 - chloro - N - (4 - methyl - benzenesulfonyl) - N'-n-butyl-formamidine.

5. 1 - chloro - N - (4 - methyl - benzenesulfonyl) - N'-cyclohexyl-formamidine.

6. 1 - chloro - N - (4 - methyl - benzenesulfonyl) - N' - cyclooctyl-formamidine.

7. 1 - chloro - N - (4 - chloro - benzenesulfonyl) - N' - n-propyl-formamidine.

8. 1 - chloro - N - (4 - chloro - benzenesulfonyl) - N'-benzyl-formamidine.

9. 1 - chloro - N - (4 - methoxy - benzenesulfonyl) - N'-(γ-methoxy-propyl)-formamidine.

10. 1 - chloro - N - (cyclohexane - sulfonyl) - N' - isobutyl-formamidine.

11. 1 - chloro - N - (4 - acetylamino - benzenesulfonyl)-N'-isobutyl-formamidine.

References Cited in the file of this patent

UNITED STATES PATENTS 2,312,404    Haack _____ Mar. 2, 1943

FOREIGN PATENTS 949,285    Germany _____ Sept. 20, 1956
1,119,258    Germany _____ Dec. 14, 1961

OTHER REFERENCES

King: J. Org. Chem., vol. 25, pp. 352–356 (1960).
Tosolini: Chemische Berichte, vol. 94, pp. 2731–2737 (1961).